US009591560B2

(12) United States Patent
Kotecha

(10) Patent No.: US 9,591,560 B2
(45) Date of Patent: Mar. 7, 2017

(54) TEMPORARY CREDENTIAL ASSIGNMENT WHEN CONNECTING TO ROAMING WIRELESS NETWORKS

(71) Applicant: Verizon Patent and Licensing Inc., Arlington, VA (US)

(72) Inventor: Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 178 days.

(21) Appl. No.: 14/101,804

(22) Filed: Dec. 10, 2013

(65) Prior Publication Data

US 2015/0163731 A1    Jun. 11, 2015

(51) Int. Cl.
*H04W 48/18* (2009.01)
*H04W 4/26* (2009.01)
*H04W 12/08* (2009.01)

(52) U.S. Cl.
CPC ............. *H04W 48/18* (2013.01); *H04W 4/26* (2013.01); *H04W 12/08* (2013.01)

(58) Field of Classification Search
None
See application file for complete search history.

(56) References Cited

U.S. PATENT DOCUMENTS

| | | | |
|---|---|---|---|
| 6,233,457 B1 * | 5/2001 | Wiehe | H04M 3/4228 455/417 |
| 6,792,271 B1 * | 9/2004 | Sherman | H04M 15/41 455/432.1 |
| 8,041,016 B2 * | 10/2011 | Trell | H04M 11/025 379/167.07 |
| 2005/0114680 A1 * | 5/2005 | Chinnaswamy | H04L 63/0853 713/185 |
| 2007/0054663 A1 * | 3/2007 | Goldman | H04W 8/06 455/432.1 |
| 2008/0064367 A1 * | 3/2008 | Nath | H04L 63/0492 455/411 |
| 2010/0087191 A1 * | 4/2010 | Kocsis | H04L 63/0853 455/433 |
| 2010/0192212 A1 * | 7/2010 | Raleigh | G06Q 10/06375 726/7 |
| 2011/0130117 A1 * | 6/2011 | Fan | H04M 15/00 455/411 |
| 2011/0130118 A1 * | 6/2011 | Fan | H04M 15/00 455/411 |

(Continued)

*Primary Examiner* — Hilina K Demeter

(57) ABSTRACT

A network device may receive, from a first telecommunications network, one or more temporary credentials that allow access to the first telecommunications network; receive, from a user device, a request to access the first telecommunications network; provide, to a server device associated with a second telecommunications network associated with the user device, a service validation request; receive, from the server device, a service validation response indicating that the user device is permitted to access the first telecommunications network; provide, based on receiving the service validation response, a particular temporary credential, of the one or more temporary credentials, to the user device; and transmit data to or from the user device via the first telecommunications network when the particular temporary credential is used to access the telecommunications network.

20 Claims, 11 Drawing Sheets

(56) References Cited

U.S. PATENT DOCUMENTS

| | | | |
|---|---|---|---|
| 2013/0031615 A1* | 1/2013 | Woodward | H04W 8/02 |
| | | | 726/4 |
| 2013/0124739 A1* | 5/2013 | Oda | H04W 4/005 |
| | | | 709/227 |
| 2013/0217396 A1* | 8/2013 | Geffner | H04W 8/26 |
| | | | 455/445 |
| 2015/0148032 A1* | 5/2015 | Rainer | H04W 8/205 |
| | | | 455/432.1 |

* cited by examiner

| Credentials Repository 510 | |
|---|---|
| Network ID | Temporary Credential List |
| N123 | -Temp. Phone #1<br>-IMSI 1<br>-Temp Phone #2<br>-IMSI 2 |
| N456 | -Temp. Phone #3<br>-IMSI 3<br>-Temp Phone #4<br>-IMSI 4 |
| N789 | -Temp. Phone #5<br>-IMSI 5<br>-Temp Phone #6<br>-IMSI 6 |
| ... | |

| Temporary Credentials Assignment Repository 520 | | | |
|---|---|---|---|
| UDID | Home Credentials | Roaming Network ID | Temporary Credentials |
| UDID 1 | -Home Telephone # 1<br>-Home IMSI #1 | N123 | -Temp. Phone #1<br>-IMSI 1 |
| UDID 2 | -Home Telephone # 2<br>-Home IMSI #2 | N456 | -Temp. Phone #3<br>-IMSI 3 |
| UDID 3 | -Home Telephone # 3<br>-Home IMSI #3 | N789 | -Temp. Phone #5<br>-IMSI 5 |
| ... | | | |

Fig. 5

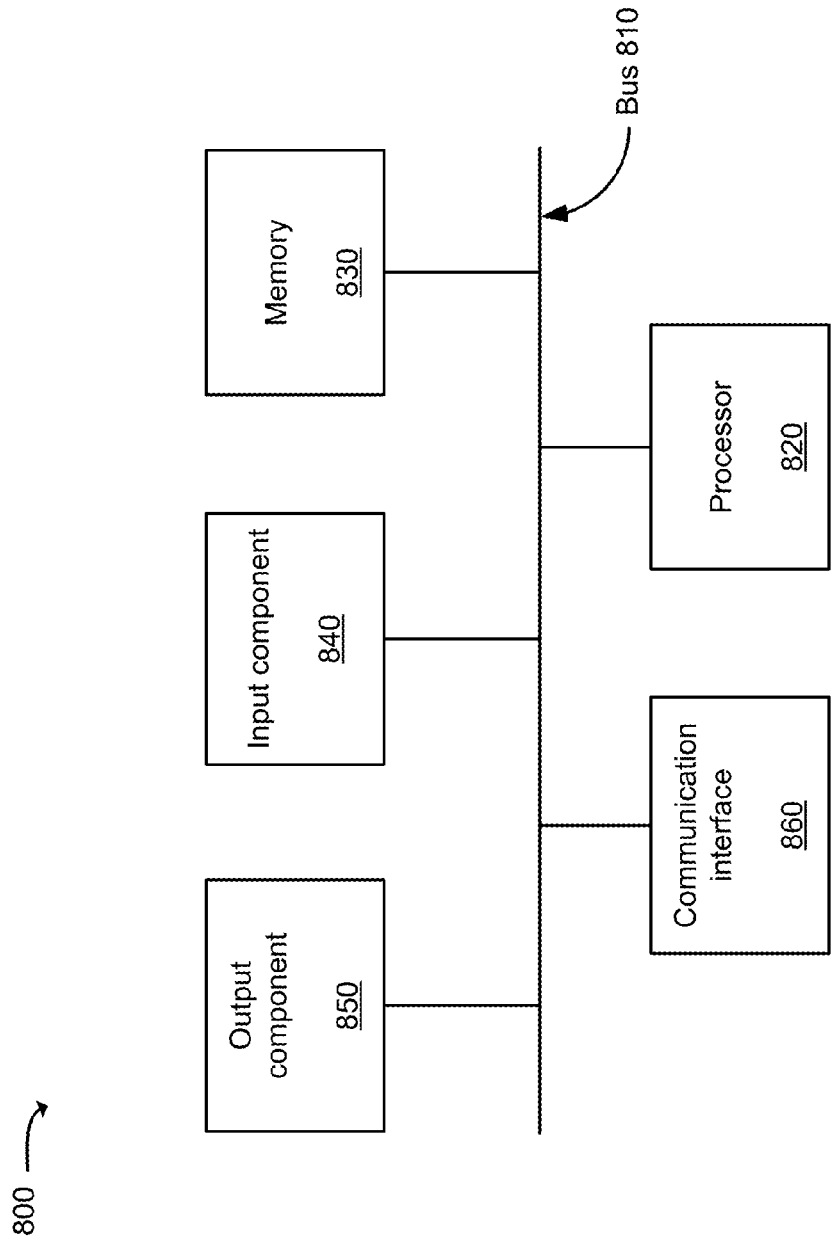

TEMPORARY CREDENTIAL ASSIGNMENT WHEN CONNECTING TO ROAMING WIRELESS NETWORKS

BACKGROUND

User devices communicate via wireless networks (e.g., cellular networks) to send and receive telephone calls and/or data packets relating to messaging, voice over internet protocol (VOIP) calls, audio/video data, or the like. A user device may be subscribed to a particular cellular network (e.g., a home wireless network) that services a particular geographic area. When the user device relocates outside of the service area of the home wireless network, the user device may connect to a roaming wireless network to receive network connectivity and to send and/or receive telephone calls and/or data packets.

Transmitting or receiving data (e.g., calling data, data packets, etc.) by the user device via the roaming wireless network may be costly and may consume significant network resources. When transmitting or receiving data via the roaming wireless network, the roaming wireless network may need to communicate with the home wireless network in order to transmit the data to and/or from the user device. For example, when the user device requests data, the roaming wireless network may transmit the request for the data back to the home wireless network. The home wireless network may then transmit the data back to the roaming wireless network to be delivered to the user device. The home wireless network may track the usage of the roaming wireless network by the user device for account charging purposes.

BRIEF DESCRIPTION OF THE DRAWINGS

FIG. 5 illustrates example data structures which may store temporary credential assignment information;

FIG. 8 illustrates example components of a device that may be used in accordance with implementations described herein.

DETAILED DESCRIPTION OF THE PREFERRED EMBODIMENTS

The following detailed description refers to the accompanying drawings. The same reference numbers in different drawings may identify the same or similar elements.

A wireless network provider may have a roaming agreement with another wireless network provider, whereby user devices (e.g., mobile telephones) associated with the wireless network provider may attach to a wireless network associated with the other wireless network provider, and vice versa. Systems and/or methods, as described herein, may provide temporary credentials for a user device to access a roaming wireless network on a temporary basis.

In some implementations, the temporary credentials may include a temporary telephone number that can be used by the user device to receive an incoming telephone call or to place an outgoing telephone call, without requiring that the roaming wireless network communicate with the home wireless network to process the call. Additionally, or alternatively, the temporary credentials may include a temporary international mobile subscriber identifier (IMSI) to allow the user device to send and receive data without requiring that the roaming wireless communicate with the home wireless network to process data requests. In some implementations, the temporary credentials can be stored by a subscriber identity module (SIM) card, associated with the user device, such that a second user device or a second SIM card may not be needed when the user device connects to the roaming wireless network.

Figure 1A:
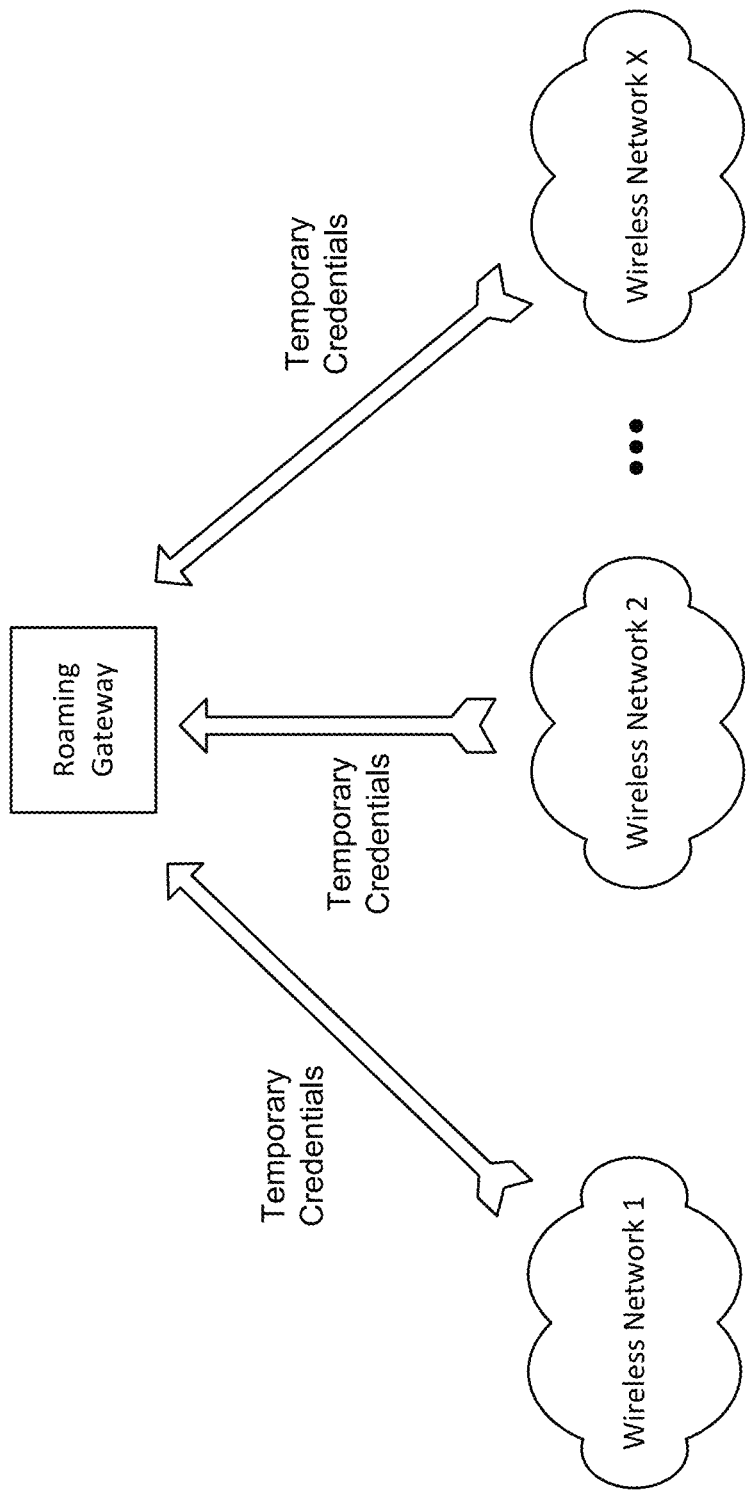
FIGS. 1A and 1B illustrate an example overview of an implementation described herein.
Figure 1B:
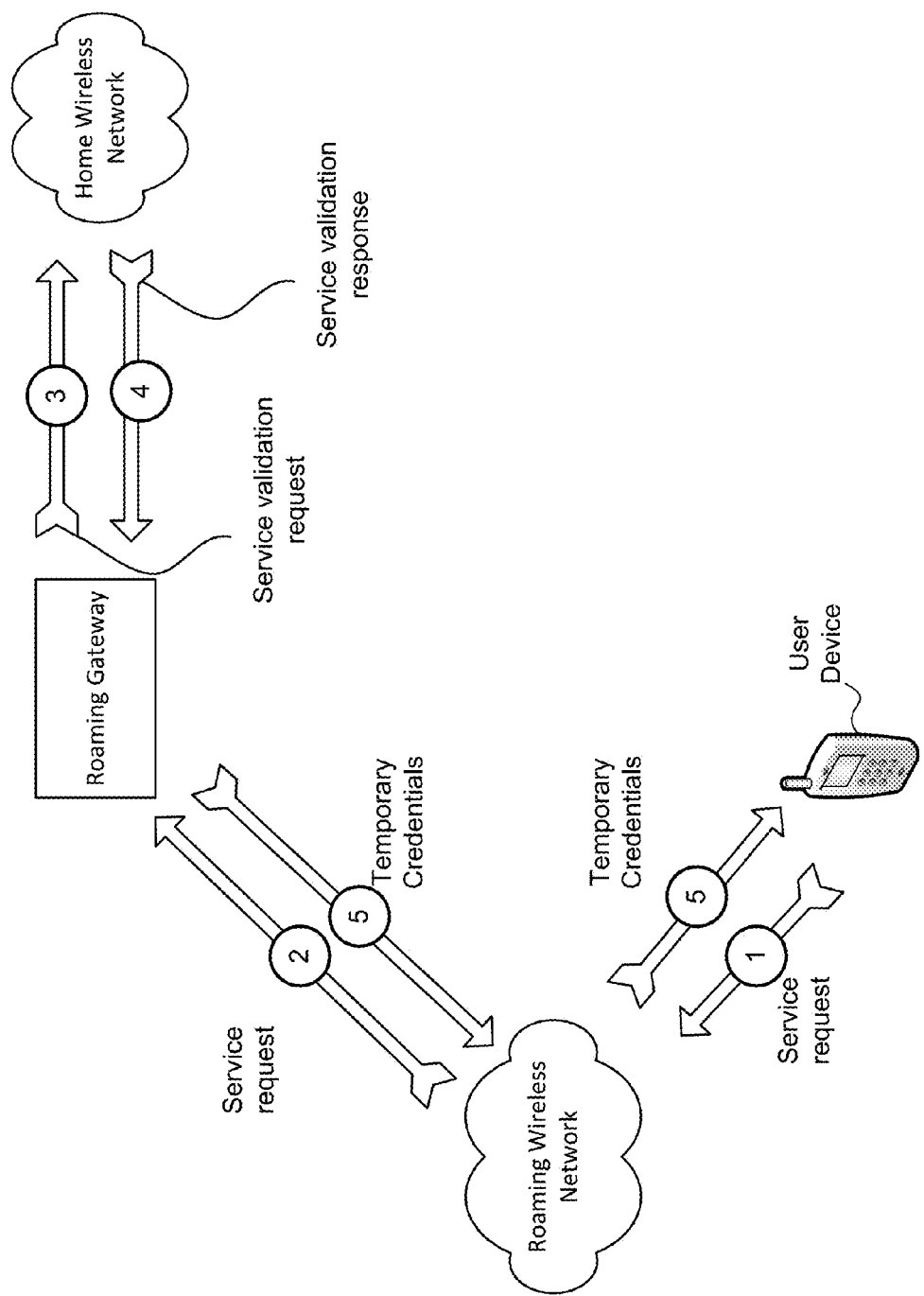

FIGS. 1A and 1B illustrate an example overview of an implementation described herein. As shown in FIG. 1A, a set of wireless networks ("Wireless Network 1," "Wireless Network 2," and "Wireless Network X" in FIG. 1A) may each provide a set of temporary credentials to a roaming gateway. The temporary credentials may be available to be assigned to user devices that connect to the wireless networks on a roaming basis.

Referring to FIG. 1B, a user device may output (arrow "1," in the figure) a service request to a particular roaming wireless network. In some implementations, the service request may include information identifying the user device, the home wireless network associated with the user device, and a request to access the roaming wireless network. The roaming wireless network may output (arrow "2") the service request to the roaming gateway, and the roaming gateway may output (arrow "3") a service validation request to the home wireless network (e.g., based on information in the service request that identifies the home wireless network). In some implementations, the service validation request may include the information identifying the user device, and a request to validate that the user device is authorized to access the roaming wireless network (e.g., based on subscription information that identifies whether the user is authorized to access the roaming wireless network, for example, at a different service charging rate than when the user device accesses the home wireless network).

Based on receiving the service validation request, and assuming that the user device is authorized to access the roaming wireless network, the home wireless network may provide (arrow "4") a service validation response that indicates that the user device may access the roaming wireless network. Based on receiving the service validation response, the roaming gateway may identify available temporary credentials associated with the particular roaming wireless network (e.g., temporary credentials that are not currently assigned to another user device), and may assign the temporary credentials to the user device. The temporary credentials may correspond to temporary credentials that were previously received from the particular roaming wireless network (e.g., as shown in FIG. 1A).

As further shown in FIG. 1B, the roaming gateway may provide (arrow "5") the temporary credentials to the user device via the roaming wireless network. Based on receiving the temporary credentials, the user device may store the temporary credentials (e.g., in a SIM card of the user device). As described above, the temporary credentials may include a temporary telephone number and/or IMSI, which can be used by the user device to receive an incoming telephone call, to place an outgoing telephone call, and/or to send and/or receive data without requiring that the roaming wireless network communicate with the home wireless network to process the call and/or data requests.

In some implementations, the roaming gateway may meter the user device's usage while on the roaming wireless network (e.g., a quantity of minutes in which the temporary telephone number was used, a measure of data that was provided to and/or from the user device using the temporary IMSI, etc.), and may provide the usage information to the home wireless network to permit the home wireless network to assess charges to an account of the user device based on the usage information. While the user device may use a temporary telephone number to place and/or receive telephone calls, a permanent or home telephone number may still be available for use by the user device to place or receive telephone calls, thereby ensuring that the user device may still be reached when a caller uses the permanent or home telephone number.

Figure 2A:
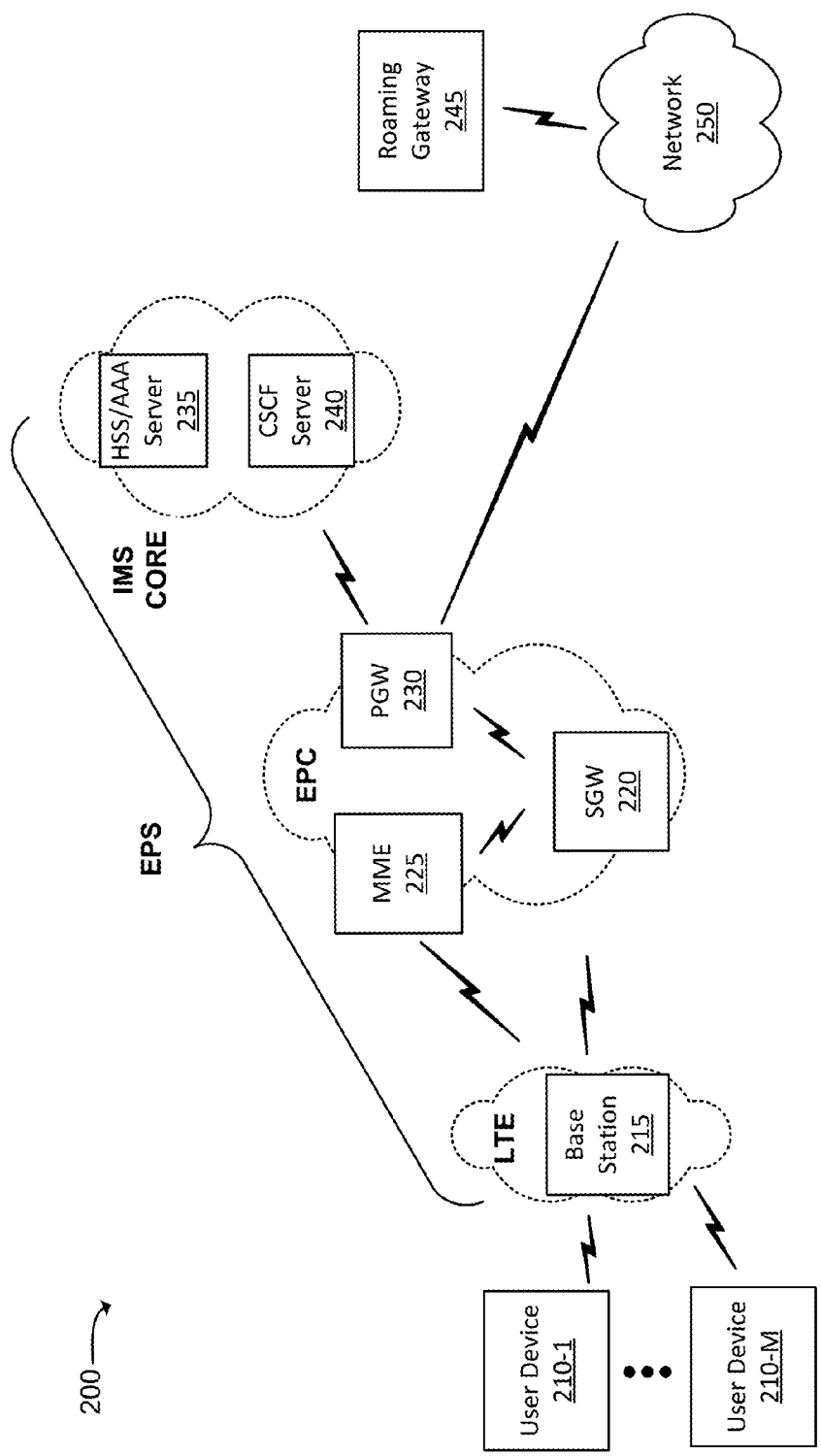
FIGS. 2A and 2B illustrate example environments in which systems and/or methods, described herein, may be implemented.
Figure 2B:
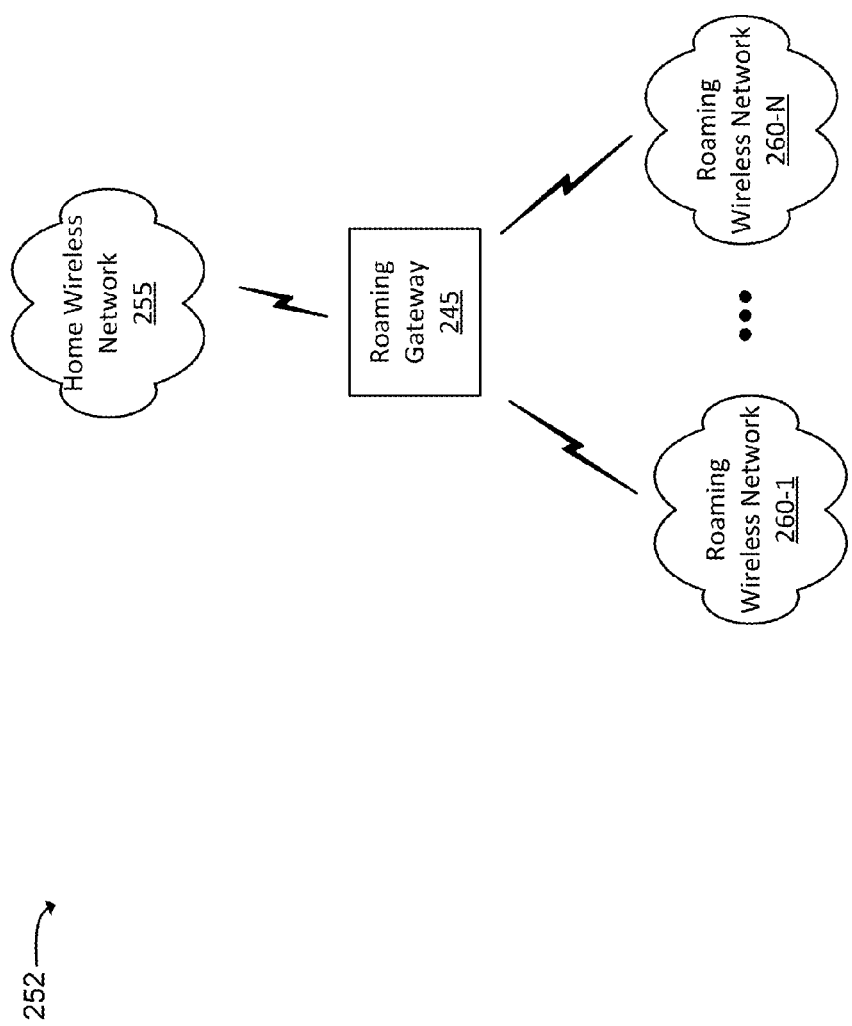

FIGS. 2A and 2B illustrate example environments in which systems and/or methods, described herein, may be implemented. As shown in FIG. 2A, environment 200 may include user devices 210-1 through 210-M (where M≥1), base station 215, serving gateway (SGW) 220, mobility management entity device (MME) 225, packet data network (PDN) gateway (PGW) 230, home subscriber server (HSS)/authentication, authorization, accounting (AAA) server 235 (referred to as an "HSS/AAA server 235"), call service control function (CSCF) server 240, roaming gateway 245, and network 250.

Environment 200 may include an evolved packet system (EPS) having a radio access network (RAN), that is associated with a long-term evolution (LTE) network and/or some other type of network, and an evolved packet core (EPC) that operate based on a third generation partnership project (3GPP) wireless communication standard. The RAN network may include one or more base stations, such as evolved Node Bs (eNBs), via which user device 210 communicates with the EPC. The EPC may include SGW 220, MME 225, and/or PGW 230 and may enable user device 210 to communicate with network 250 and/or an Internet protocol (IP) multimedia subsystem (IMS) core. The IMS core may include HSS/AAA server 235 and CSCF server 240, and may process telephone calls on behalf of user device 210, and may manage authentication, connection initiation, account information, user profile information, etc. associated with user device 210.

User device 210 may include a computation or communication device, such as a wireless mobile communication device that is capable of communicating with base station 215 and/or a network (e.g., network 250, home wireless network 255, and/or roaming wireless network 260). For example, user device 210 may include a radiotelephone, a personal communications system (PCS) terminal (e.g., a device that combines a cellular radiotelephone with data processing and data communications capabilities), a personal digital assistant (PDA), a smart phone, a laptop computer, a tablet computer, a camera, a personal gaming system, or another type of computation or communication device. User device 210 may send data to and/or receive data from network 250.

Base station 215 may include one or more network devices that receive, process, and/or transmit traffic, such as audio, video, text, and/or other data, destined for and/or received from user device 210. In an example implementation, base station 215 may be an eNB device and may be part of the LTE network. Base station 215 may receive traffic from and/or send traffic to network 250 via SGW 220 and PGW 230. Base station 215 may send traffic to and/or receive traffic from user device 210 via an air interface. One or more base stations 225 may be associated with a RAN.

SGW 220 may include one or more network devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 220 may, for example, aggregate traffic received from one or more base stations 225 and may send the aggregated traffic to network 250 via PGW 230. In one example implementation, SGW 220 may route and forward user data packets, may act as a mobility anchor for a user plane during inter-eNB handovers, and may act as an anchor for mobility between LTE and other 3GPP technologies.

MME 225 may include one or more network devices that perform operations associated with a handoff to and/or from the EPS. MME 225 may perform operations to register user device 210 with the EPS, to handoff user device 210 from the EPS to another network, to handoff a user device 210 from the other network to the EPS, and/or to perform other operations. MME 225 may perform policing operations for traffic destined for and/or received from user device 210. MME 225 may authenticate user device 210 (e.g., via interaction with HSS/AAA server 235).

PGW 230 may include one or more network devices, such as a gateway, a router, a modem, a switch, a firewall, a NIC, a hub, a bridge, a proxy server, an OADM, or some other type of device that processes and/or transfers traffic. PGW 230 may, for example, provide connectivity of user device 210 to external packet data networks by being a traffic exit/entry point for user device 210. PGW 230 may perform policy enforcement, packet filtering, charging support, lawful intercept, and/or packet screening. PGW 230 may also act as an anchor for mobility between 3GPP and non-3GPP technologies.

HSS/AAA server 235 may include one or more computing devices, such as a server device or a collection of server devices. In some implementations, HSS/AAA server 235 may include a device that gathers, processes, searches, stores, and/or provides information in a manner described herein. For example, HSS/AAA server 235 may manage, update, and/or store, in a memory associated with HSS/AAA server 235, profile information associated with user device 210 that identifies applications and/or services that are permitted for and/or accessible by user device 210, such as roaming network access services, bandwidth or data rate thresholds associated with the applications or services, information associated with a user of user device 210 (e.g., a username, a password, a personal identification number (PIN), etc.), rate information, minutes allowed, and/or other information.

Additionally, or alternatively, HSS/AAA server 235 may include a device that performs authentication, authorization, and/or accounting operations associated with a communication connection with user device 210. In some implementations, HSS/AAA server 235 may maintain billing information and may assess charges and credits to an account associated with user device 210 based on network usage information received from the EPC and/or from roaming gateway 245. Additionally, or alternatively, HSS/AAA server 235 may store information regarding temporary credentials that may be assigned to user device 210.

CSCF server 240 may include one or more computing devices that process and/or route IMS traffic to and from user device 210 via the EPC. For example, CSCF server 240 may process traffic, associated with services provided by the IMS core, that are destined for user device 210. In another example, CSCF server 240 may process traffic, received from user device 210, that are destined for the IMS core.

Roaming gateway 245 may include one or more computing devices, such as a server device or a collection of server devices. Additionally, roaming gateway 245 may include one or more network devices, such as a gateway, a router, a modem, a switch, a firewall, a NIC, a hub, a bridge, a proxy server, an OADM, and/or or some other type of device that processes and/or transfers traffic. In some implementations, roaming gateway 245 may communicate with HSS/AAA server 235 to receive information regarding temporary credentials that may be assigned to user device 210 to permit user device 210 to connect with roaming wireless network 260 on a roaming basis. Roaming gateway 245 may maintain information that identifies temporary credentials that may be assigned to user device 210 (e.g., temporary credentials that are not currently assigned). In some implementations, roaming gateway 245 may monitor usage of a roaming wireless network by user device 210 to determine usage information (e.g., when user device 210 places telephone calls, receives telephone calls, and/or sends/receives data via the roaming wireless network using temporary credentials). For example, the usage information may relate to traffic transmitted to and/or from user device 210 via roaming gateway 245. Based on determining usage information, roaming gateway 245 may provide the usage information to HSS/AAA server 235 associated with a home wireless network of user device 210.

Network 250 may include one or more wired and/or wireless networks. For example, network 250 may include a cellular network (e.g., a second generation (2G) network, a third generation (3G) network, a fourth generation (4G) network, a fifth generation (5G) network, an LTE network, a global system for mobile (GSM) network, a code division multiple access (CDMA) network, an evolution-data optimized (EVDO) network, or the like), a public land mobile network (PLMN), and/or another network. Additionally, or alternatively, network 250 may include a local area network (LAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

Referring to FIG. 2B, environment 252 may include roaming gateway 245, home wireless network 255, and roaming wireless network 260-1 through 260-N (where N≥1), sometimes referred to herein individually as "roaming wireless network 260." Home wireless network 255 and/or roaming wireless networks 260-1 through 260-N may include components shown in FIG. 2A. For example, home wireless network 255 and/or roaming wireless networks 260-1 through 260-N may each include a RAN (e.g., an LTE network), a backhaul network (e.g., an EPC network), and/or an IMS core. Thus, in some implementations, wireless network 255 and/or roaming wireless networks 260-1 through 260-N may each include one or more base stations 215, one or more SGWs 220, one or more MMEs 225, one or more PGWs 230, one or more HSS/AAA servers 235, and/or one or more CSCF servers 240. Home wireless network 255 may be a "home" network with respect to a particular user device 210, while roaming wireless networks 260-1 through 260-N may be "roaming" networks with respect to the particular user device 210.

Roaming wireless network 260 may communicate with roaming gateway 245 to provide information regarding temporary credentials that may be assigned to user device 210, to allow user device 210 to access roaming wireless network 260. Home wireless network 255 may communicate with roaming gateway 245 to provide service validation responses, indicating whether user device 210 is permitted to access roaming wireless network 260. Roaming gateway 245 may, in some implementations, provide usage information to home wireless network 255, indicating a measure of usage (e.g., minutes, amount of data, etc.) consume by user device 210 when accessing a particular roaming wireless network 260.

In some implementations, a home wireless network 255, with respect to one user device 210, may be a roaming wireless network 260 with respect to another user device 210. Further, a roaming wireless 220, with respect to one user device 210, may be a home wireless network 215 with respect to another user device 210. Home wireless network 255 or roaming wireless network 260 may be referred to generically as "wireless network 255/260." Home wireless network 255 or roaming wireless network 260 may be telecommunications networks.

The quantity of devices and/or networks in environment is not limited to what is shown in FIGS. 2A and 2B. In practice, environments 200 and/or 252 may include additional devices and/or networks; fewer devices and/or networks; different devices and/or networks; or differently arranged devices and/or networks than illustrated in FIGS. 2A and 2B. Also, in some implementations, one or more of the devices of environments 200 and/or 252 may perform one or more functions described as being performed by another one or more of the devices of environments 200 and/or 252. Devices of environments 200 and/or 252 may interconnect via wired connections, wireless connections, or a combination of wired and wireless connections.

Figure 3:
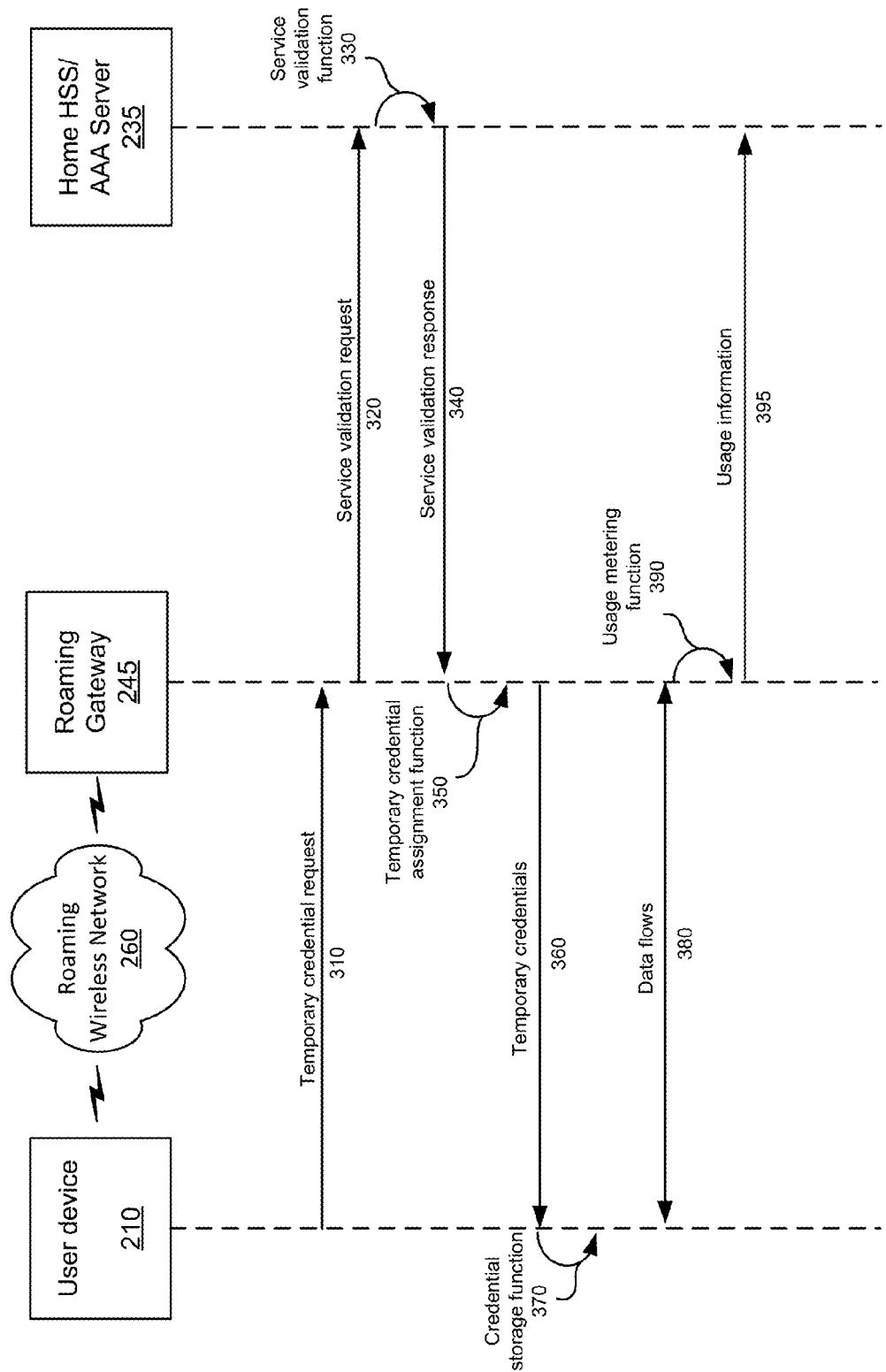
FIG. 3 illustrates a signal flow diagram illustrating example operations to assign a user device with temporary credentials to access a roaming wireless network.

FIG. 3 illustrates a signal flow for assigning user device 210 with temporary credentials to access roaming wireless network 260, and providing usage information of usage of roaming wireless network 260 by user device 210 to home HSS/AAA server 235. As shown in FIG. 3, user device 210 may be connected to roaming wireless network 260. As also shown, user device 210 may provide temporary credential request 310 to roaming gateway 245 (e.g., as part of an initial attachment procedure with roaming wireless network 260). In some implementations, temporary credential request 310 may include an identifier (ID) of user device 210, an ID of home wireless network 255 and/or home HSS/AAA server 235 associated with user device 210, a request for temporary credentials to access roaming wireless network 260, and/or some other information regarding user device 210.

As shown in FIG. 3, roaming gateway 245 may receive temporary credential request 310 from user device 210 via roaming wireless network 260. Based on receiving temporary credential request 310, roaming gateway 245 may identify the particular roaming wireless network 260 shown in FIG. 3 based on an IP address via which temporary credential request 310 is received and/or based on some other technique. Further, roaming gateway 245 may provide service validation request 320 to home HSS/AAA server 235. For example, roaming gateway 245 may identify home HSS/AAA server 235 based on information included in temporary credential request 310. Roaming gateway 245 may further output a service validation request 320 to determine whether user device 210 is permitted to access roaming wireless network 260. In some implementations, service validation request 320 may include the ID of user device 210 included in temporary credential request 310.

Based on receiving service validation request 320, home HSS/AAA server 235 may perform service validation function 330 to determine whether user device 210 is permitted to access roaming wireless network 260. In some implementations, this determination may be based on subscription information associated with user device 210. For example, home HSS/AAA server 235 may locate the ID of user device 210 in a data structure that identifies authorized services and/or subscriptions associated with user device 210. Further, home HSS/AAA server 235 may determine whether user device 210 may access roaming wireless network 260 based on the data structure and the ID of user device 210. In FIG. 3, assume that user device 210 is permitted to access roaming wireless network 260. Given this assumption, home HSS/AAA server 235 may provide service validation response 340, which may indicate that user device 210 is permitted to access roaming wireless network 260.

As described above, roaming gateway 245 may maintain information regarding temporary credentials that may be assigned to user device 210 to permit user device 210 to access roaming wireless network 260. For example, roaming gateway 245 may store a list of temporary credentials associated with the particular roaming wireless network 260 shown in FIG. 3, and may store information identifying temporary credentials that are currently available to be assigned (e.g., temporary credentials that are not currently assigned to other user devices 210).

Based on receiving service validation response 340, roaming gateway 245 may perform temporary credential assignment function 350. For example, roaming gateway 245 may select available temporary credentials (e.g., temporary credentials that are not currently assigned to other user devices 210). As mentioned above, temporary credentials 360 may include a temporary telephone number, a temporary IMSI, and/or some other temporary credential. Roaming gateway 245 may provide the selected temporary credentials 360 to user device 210. Further, roaming gateway 245 may store information identifying that temporary credentials 360 have been assigned to user device 210, so that temporary credentials 360 may not be assigned to other user devices 210. As described in greater detail below with respect to FIG. 6, roaming gateway 245 may release temporary credentials 360 when temporary credentials 360 are no longer in use by user device 210 (e.g., to make temporary credentials 360 available for use by other user devices 210). Once user device 210 receives temporary credentials 360, user device 210 may perform credential storage function 370 to store temporary credentials 360 (e.g., in a SIM card of user device 210 and/or in some other storage medium associated with user device 210).

As further shown in FIG. 3, user device 210 may send and/or receive data flows 380 (e.g., traffic) via roaming wireless network 260 and roaming gateway 245 using temporary credentials 360. In some implementations, data flows 380 may include data associated with telephone calls to and/or from user device 210 and/or data packets provided to and/or from user device 210 (e.g., data packets relating to audio/video content, voice over IP (VOIP) calls, web browsing, applications, instant messages, e-mails, etc.).

As further shown in FIG. 3, roaming gateway 245 may perform usage metering function 390 determine a measure of network usage of roaming wireless network 260 by user device 210 and form usage information 395 identifying the measure of network usage. For example, usage information 395 may include a number of telephone calling minutes used by user device 210, a number of bytes transferred to and/or from user device 210, and/or some other measure of network usage. As further shown in FIG. 3, roaming gateway 245 may provide usage information 395 to home HSS/AAA server 235 such that home HSS/AAA server 235 may assess charges to an account of user device 210.

When temporary credentials 360 are used to send and/or receive data flows to and/or from user device 210 via roaming wireless network 260, data flows may be transmitted without involving home wireless network 255, thereby reducing costs and/or network load in relation to when permanent/home credentials are used to send and/or receive data flows via roaming wireless network 260. For example, when user device 210 places an outgoing telephone call using a temporary telephone number included in temporary credentials 360, roaming wireless network 260 may process the telephone call without involving home wireless network 255. Similarly, when user device 210 accesses roaming wireless network 260 using a temporary IMSI to send and/or receive data packets, roaming wireless network 260 may transmit the data packets without involving home wireless network 255.

Figure 4:
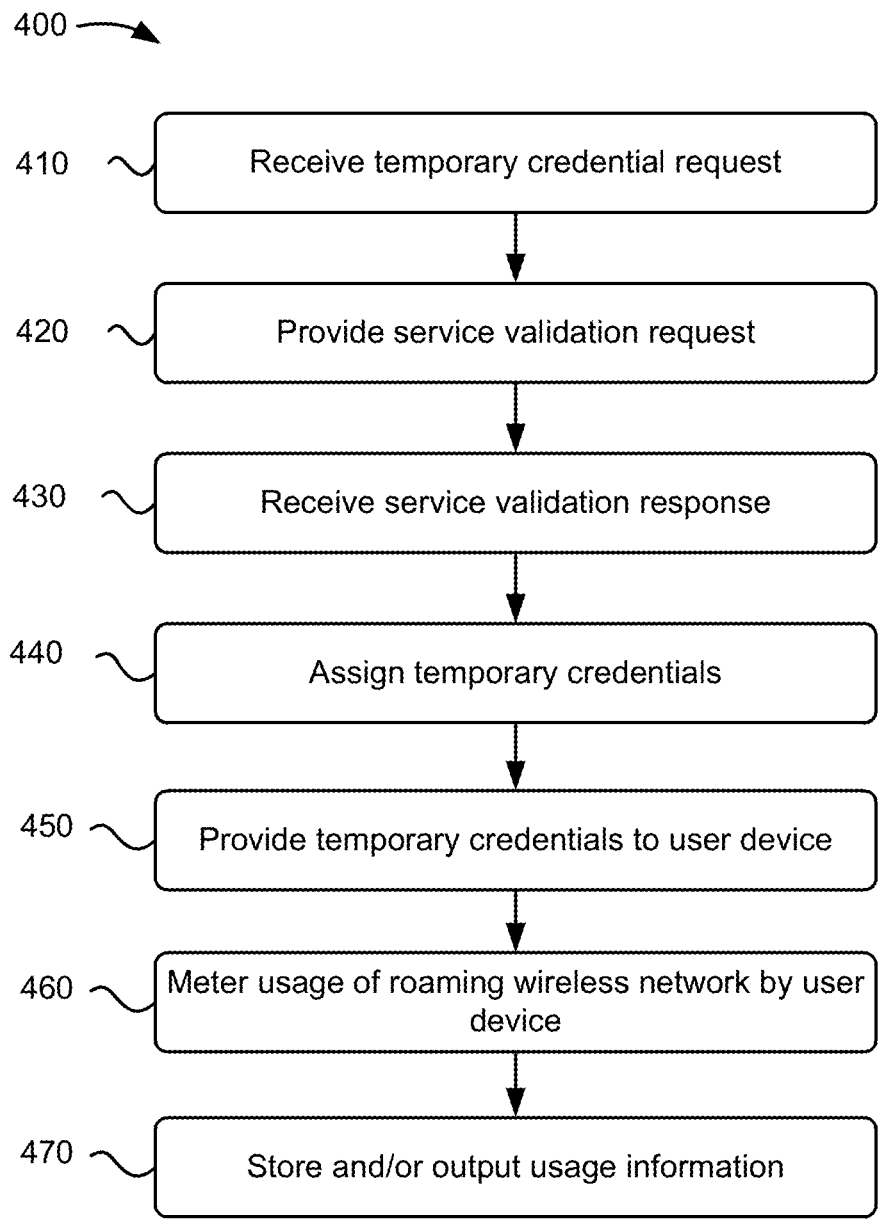
FIG. 4 illustrates a flowchart of an example process for assigning temporary credentials and processing charging information for a user device.

FIG. 4 illustrates a flowchart of an example process 400 for assigning temporary credentials and processing charging information for a user device. In some implementations, process 400 may be performed by one or more components of roaming gateway 245. In some implementations, some or all of blocks of process 400 may be performed by one or more components of another device in environment 200 and/or environment 252 (e.g., HSS/AAA server 235), or a group of devices including or excluding roaming gateway 245.

As shown in FIG. 4, process 400 may include receiving a temporary credential request (block 410). For example, as described above with respect to temporary credential request 310, roaming gateway 245 may receive a temporary credential request from user device 210. User device 210 may request temporary credentials when, for example, user device 210 moves out of a service area of home wireless network 255 and within a service area of roaming wireless network 260. In some implementations, the temporary credential request may include an ID of user device 210, an ID of home wireless network 255 and/or home HSS/AAA server 235 associated with user device 210, a request for temporary credentials to access roaming wireless network 260, and/or some other information regarding user device 210.

Process 400 may also include providing a service validation request (block 420). For example, as described above with respect to service validation request 320, roaming gateway 245 may identify home HSS/AAA server 235 (e.g., an HSS/AAA server 235 associated with a home wireless network 255 of user device 210) based on information included in the temporary credential request. Further, roaming gateway 245 may provide a service validation request to home HSS/AAA server 235. In some implementations, the service validation request may include the ID of user device 210 included in the temporary credential request.

Process 400 may further include receiving a service validation response (block 430). For example, as described above with respect to service validation response 340, roaming gateway 245 may receive (e.g., from home HSS/AAA server 235) a service validation response that indicates whether user device 210 is permitted to access roaming wireless network 260. If the service validation response indicates that user device 210 is not permitted to access roaming wireless network 260, roaming gateway 245 may provide an indication to user device 210 that access to roaming wireless network 260 has been denied (not shown). In some implementations, roaming gateway 245 may provide instructions for user device 210 to update a subscription and/or service profile so that user device 210 may access roaming wireless network 260.

If, on the other hand, service validation response 340 indicates that user device 210 is permitted to access roaming wireless network 260, process 400 may further include assigning temporary credentials (block 440). For example, as described above with respect to temporary credential assignment function 350, roaming gateway 245 may select available temporary credentials, based on information maintained by roaming gateway 245, that identifies available temporary credentials for roaming wireless network 260. Further, roaming gateway 245 may store information indicating that the selected temporary credentials have been assigned to user device 210.

Process 400 may further include providing the temporary credentials to the user device (block 450). For example, roaming gateway 245 may provide the selected temporary credentials (e.g., a temporary telephone number, a temporary IMSI, and/or some other temporary credential) to user device 210.

Process 400 may also include metering usage of the roaming wireless network by the user device (block 460). For example, when the temporary credentials are used by user device 210 to send and/or receive data flows (e.g., traffic) to and/or from user device 210 via roaming wireless network 260, roaming gateway 245 may facilitate the transmission of the data flows and may meter the usage (e.g., monitor an amount of usage) of the roaming wireless network 260 by user device 210. In some implementations, roaming gateway 245 may meter the usage based on a quantity of bytes transmitted to and/or from user device 210 using the temporary credentials and/or a quantity of calling minutes used by user device 210 using the temporary credentials. Roaming gateway 245 may generate usage information which identifies the usage of roaming wireless network 260 (e.g., in terms of a quantity of bytes and/or a quantity of calling minutes), Process 400 may further include storing and/or outputting the usage information (block 470). For example, roaming gateway 245 may output the usage information to home HSS/AAA server 235 and/or to another device. Additionally, or alternatively, roaming gateway 245 may store the usage information (e.g., for later retrieval). As described above, home HSS/AAA server 235 may generate billing information for user device 210 (e.g., assess monetary charges to an account of user device 210) based on the usage information.

FIG. 5 illustrates example data structures 510 and 520. As shown in FIG. 5, data structure 510 may correspond to credentials repository 510 which may include a list of temporary credentials that may be assigned to user devices 210 connecting to particular roaming wireless networks 260. Data structure 520 may correspond to temporary credentials assignment repository 520, which may include information identifying home credentials, assigned temporary credentials, and roaming wireless networks 220 connected to user devices 210.

In some implementations, data structures 510 and/or 520 may be stored by roaming gateway 245 (e.g., in a memory device associated with roaming device, in a memory separate from, but accessible by, roaming gateway 245 (such as a "cloud" storage device), etc.). In some implementations, data structures 510 and/or 520 may be stored by another device, such as user device 210 and/or HSS/AAA server 235. A particular instance of data structure 510 and/or data structure 520 may contain different information and/or fields than another instance of data structure 510 and/or 520.

Credentials repository 510 may store an ID of each wireless network 255/260 and corresponding lists of temporary credentials for each wireless network 255/260. In an example shown, credentials repository 510 may store a network ID of network "N123" and a corresponding list of temporary credentials, such as "Temp. Phone #1", "IMSI 1," "Temp. Phone #2," and "IMSI 2." Information stored by credentials repository 510 may be received by respective HSS/AAA servers 245 associated with each wireless network 255/260. In some implementations, information stored by credentials repository 510 may correspond to temporary credentials reserved by each wireless network 255/260 to be assigned to user devices 210.

Each entry in temporary credentials assignment repository 520 may identify a particular user device 210, home credentials associated with the particular user device 210, an ID of a particular roaming wireless network 260 connected to the particular user device 210, and temporary credentials assigned to the particular user device 210. In some implementations, information regarding temporary credentials for a particular user device 210 may be stored by the particular user device 210 (e.g., by a SIM card associated with the particular user device 210). Roaming gateway 245 may store (e.g., in temporary credentials assignment repository 520), temporary credentials assigned to user devices 210 based on performing temporary credential assignment function 350. Roaming gateway 245 may determine temporary credentials that are available to be assigned based on information stored by credentials repository 510 and information stored by temporary credentials assignment repository 520 identifying temporary credentials currently assigned. As described in greater detail with respect to FIG. 6, roaming gateway 245 may remove an entry from temporary credentials assignment repository 520 when releasing temporary credentials from a particular user device 210.

While particular fields are shown in a particular format in data structures 510 and 520, in practice, data structures 510 and 520 may include additional fields, fewer fields, different fields, or differently arranged fields than are shown in FIG. 5. Also, FIG. 5 illustrates examples of information stored by data structures 510 and 520. In practice, other examples of information stored by data structures 510 and 520 are possible.

Figure 6:
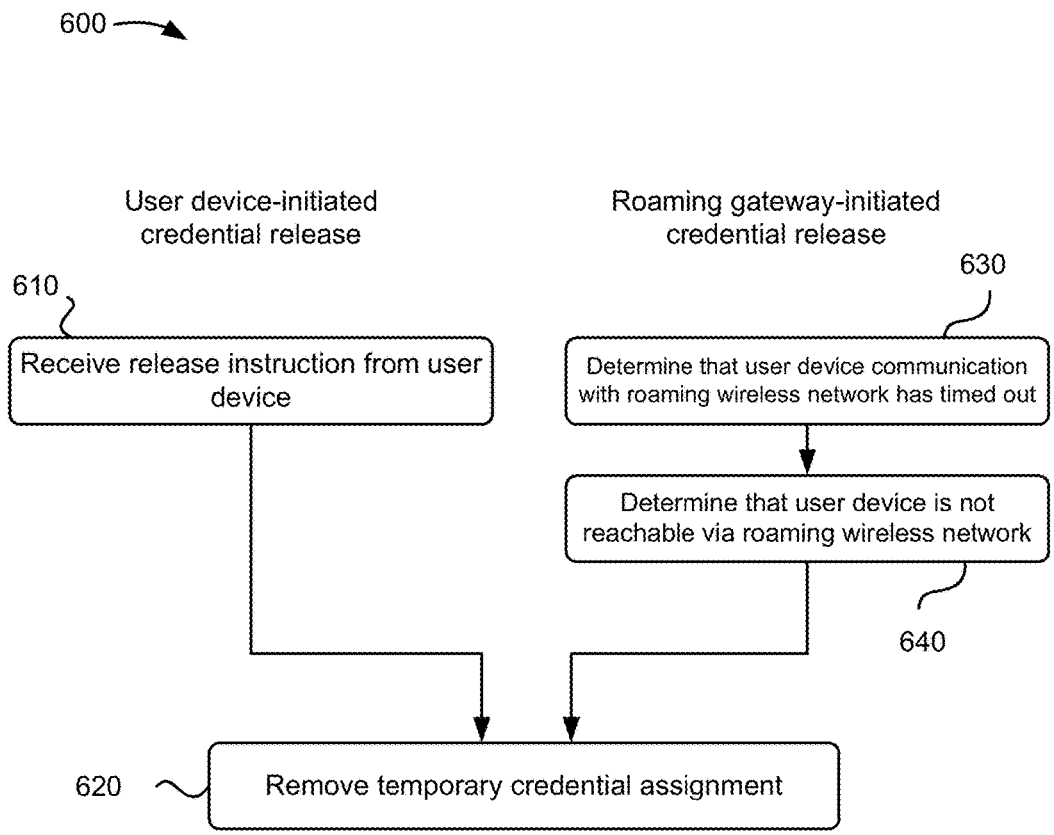
FIG. 6 illustrates a flowchart of an example process for removing a temporary credential association.

FIG. 6 illustrates a flowchart of an example process 600 for removing a temporary credential assignment. In some implementations, process 600 may be performed by one or more components of roaming gateway 245. In some implementations, some or all of blocks of process 400 may be performed by one or more components of another device in environment 200 and/or environment 252 (e.g., HSS/AAA server 235 and/or user device 210), or a group of devices including or excluding roaming gateway 245. In FIG. 6, assume that user device 210 has been assigned temporary credentials by roaming gateway 245 and that roaming gateway 245 stores information corresponding to the assignment of the temporary credentials to user device 210.

As shown in FIG. 6, process 600 may be initiated by user device 210 and/or by roaming gateway 245 to remove temporary credential assignment for user device 210. When the removal of temporary credential assignment is initiated by user device 210, process 600 may include receiving a release instruction from the user device (block 610). For example, roaming gateway 245 may receive the release instruction from user device 210. In some implementations, the release instruction may include an ID of user device 210 and an instruction to remove the assignment of temporary credentials from user device 210.

In some implementations, user device 210 may provide the release instruction when user device 210 stores the temporary credentials and disconnects from roaming wireless network 260 (e.g., when user device 210 moves outside of a service range of roaming wireless network 260). In some implementations, user device 210 may provide the release instruction after disconnecting from roaming wireless network 260 for a particular period of time (e.g., to prevent the assignment of temporary credentials from being removed when the user re-enters the service range of roaming wireless network 260 within the particular period of time). User device 210 may further remove the temporary credentials from a storage (e.g., a SIM card and/or another storage medium) based on providing the release instruction.

Process 600 may further include removing the temporary credential assignment (block 620). For example, roaming gateway 245 may remove an entry in temporary credentials assignment repository 520 that identifies the assignment of the temporary credentials to user device 210 based on receiving the release instruction from user device 210.

When the removal of temporary credential assignment is initiated by roaming gateway 245, process 600 may include determining that the user device communication with the roaming wireless network has timed out (block 630). For example, roaming gateway 245 may determine that a communication between user device 210 and roaming wireless network 260 has timed out when data flows have not been transmitted to and/or from user device 210 via roaming wireless network 260 within a predetermined timeout period. In some implementations, the predetermined timeout period may be selected to balance temporary credential availability with premature removal of temporary credential assignment. For example, a relatively longer timeout period may result in relatively fewer premature removals of temporary credential assignment. A relatively shorter timeout period may result in greater temporary credential availability by removing temporary credential assignments relatively faster.

Process 600 may further include determining that the user device is not reachable via the roaming wireless network (block 640). For example, roaming gateway 245 may provide a test query to user device 210 via roaming wireless network 260 to determine whether user device 210 is reachable. Roaming gateway 245 may determine that user device 210 is not reachable when roaming gateway 245 does not receive a response to the test query within a predetermined amount of time. If roaming gateway 245 determines that user device 210 is reachable via roaming wireless network 260 (e.g., when roaming gateway 245 receives the response to the test query), roaming gateway 245 may maintain the temporary credential assignment for user device 210. If, on the other hand, roaming gateway 245 determines that user device 210 is not reachable via roaming wireless network 260, process 600 may further include removing the temporary credential assignment for user device 210 as described above with respect to block 620.

Once the assignment of the temporary credentials has been removed, roaming gateway 245 may assign the same temporary credentials to user device 210 when user device 210 requests temporary credentials when connecting to roaming wireless network 260 at a later time. Additionally, or alternatively, roaming gateway 245 may assign the temporary credentials to another user device 210.

In some implementations, roaming gateway 245 may delay reassignment of a temporary credential such as a temporary for telephone number, for a particular time period. For example, roaming gateway 245 may delay the reassignment of the temporary telephone number to prevent telephone calls from being received by a user device 210 that may have been intended for another user device 210 that was previously assigned with the temporary telephone number. In some implementations, roaming gateway 245 may reassign the same temporary credentials to a particular user device 210 when the particular user device 210 reconnects to roaming wireless network 260 within a particular period of time.

Figure 7A:
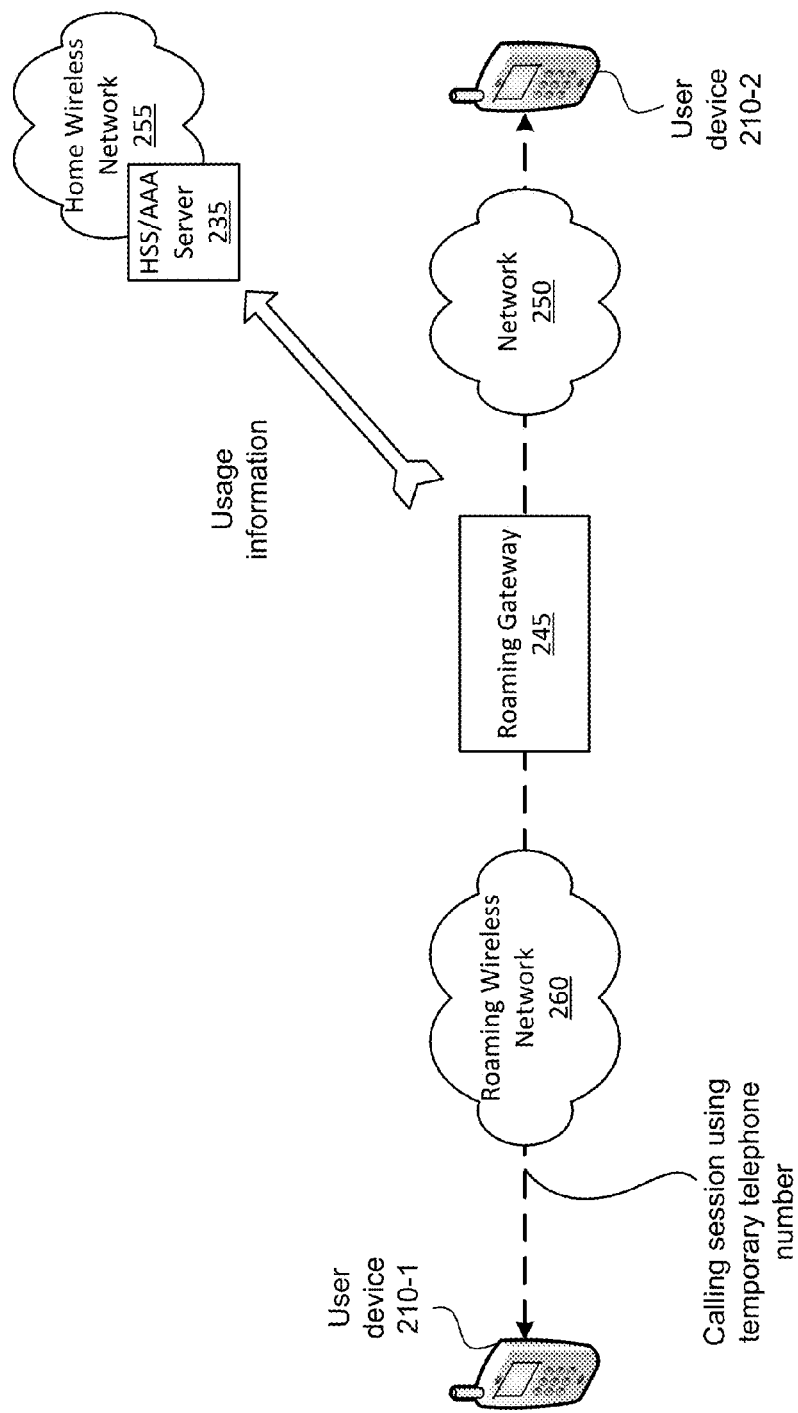
FIGS. 7A and 7B illustrate example implementations for monitoring usage of a roaming wireless network by a user device and providing usage information of the roaming wireless network.
Figure 7B:
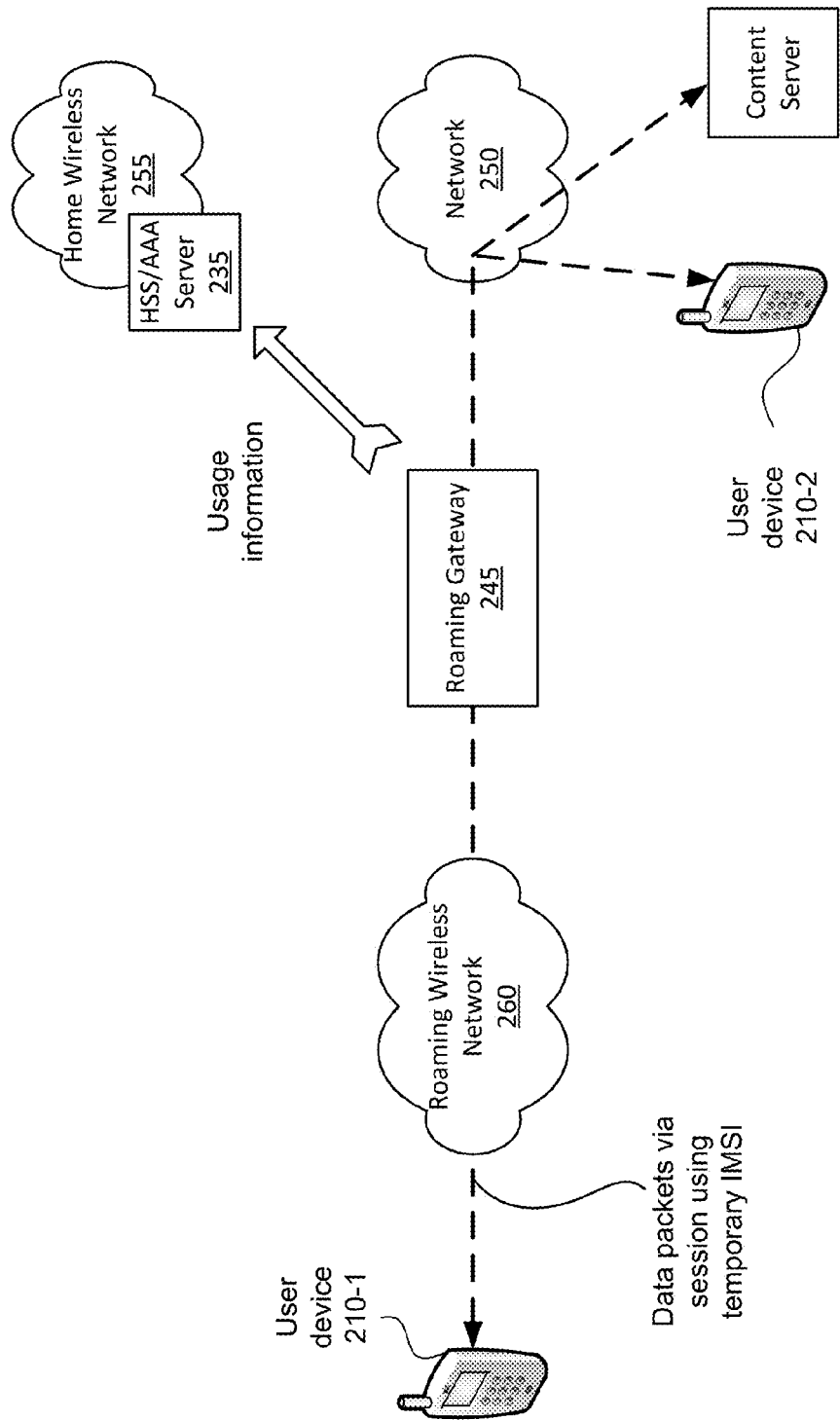

FIGS. 7A and 7B illustrate example implementations for monitoring usage of roaming wireless network 260 by user device 210 and providing usage information to home HSS/AAA server 235. In FIGS. 7A and 7B, assume that a first user device 210 (e.g., user device 210-1) is subscribed to home wireless network 255 and is connected to roaming wireless network 260. Further, assume that user device 210-1 receives and stores temporary credentials, such as a temporary telephone number and a temporary IMSI. As shown in FIG. 7A, a calling session between user device 210-1 and a second user device 210 (e.g., user device 210-2) may be established using the temporary telephone number. For example, user device 210-1 may place an outgoing telephone call using the temporary telephone number as an outgoing telephone number. Additionally, or alternatively, user device 210-2 may place a call to user device 210-1 by dialing the temporary telephone number.

As further shown in FIG. 7A, traffic via the calling session may be transmitted without involving home wireless network 255. When the temporary telephone number is used to place and/or receive a telephone call, roaming gateway 245 may gather statistics regarding the telephone call to form usage information corresponding to traffic and/or data flow transmission associated with the telephone call (e.g., a number of minutes used, a per-minute charging rate for the call based on the calling region associated with the telephone number of user device 210-2, and/or some other statistic). Roaming gateway 245 may provide the usage information (e.g., at the conclusion of the call or at some other time) to a home HSS/AAA server 235 of home wireless network 255 in order for home HSS/AAA server 235 to assess charges, corresponding to the usage information, to an account of user device 210-1.

As described above, user device 210-1 may receive a telephone call via a home telephone number or via the temporary telephone number. In some implementations (e.g., when user device 210-1 receives an incoming call), user device 210-1 may receive an indication identifying whether the incoming call is received via the home telephone number or via the temporary telephone number. In some implementations, different charging rates may apply depending on whether the incoming call is received via the home telephone number or via the temporary telephone number. In some implementations, a user of user device 210-1 may select to place an outgoing call using the home telephone number or the temporary telephone number. In some implementations, home HSS/AAA server 235 may apply charges to different accounts of user device 210-1 based on which telephone number was used to place or receive a telephone call.

Referring to FIG. 7B, data packets may be transmitted to and/or from user device 210-1 via roaming wireless network 260 using the temporary IMSI without involving home wireless network 255 to transmit the data packets to and/or from user device 210-1. For example, user device 210-1 may provide/receive data packets to and/or from user device 210-2 using the temporary IMSI. Additionally, or alternatively, user device 210-1 may provide/receive data packets to and/or from a content server using the temporary IMSI. In some implementations, the data packets may relate to audio/video data, application data, VOIP calling data, web browsing data, messaging data, or the like. Roaming gateway 245 may meter the usage of roaming wireless network 260 by user device 210-1 to form usage information. The usage information may identifying a measure of network usage of roaming wireless network 260 corresponding to traffic transmitted to and/or from user device 210-1 via roaming wireless network 260. For example, the usage information may identify a quantity of packets and/or bytes transmitted to and/or from user device 210-1. As further shown in FIG. 7B, roaming gateway 245 may provide the usage information to home HSS/AAA server 235.

While particular examples are shown in FIGS. 7A and 7B, it will be apparent that the above description is merely an example implementation. Other examples are possible in practice, and may differ from what was described with regard to FIGS. 7A and 7B.

FIG. 8 is a diagram of example components of device 800. One or more of the devices described above (e.g., with respect to FIGS. 1-3, 7A, and 7B) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio (Bluetooth is a registered trademark of Bluetooth SIG, Inc.) radio, a cellular radio, etc. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks and/or signals have been described with regard to FIGS. 3, 4, and 6, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 2A, 2B, 3, 7A, and 7B), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
receiving, by a network device and from a first telecommunications network, one or more temporary credentials that allow access to the first telecommunications network,
receiving, by the network device and from a user device, a request to access the first telecommunications network;
providing, by the network device and to a server device associated with a second telecommunications network associated with the user device, a service validation request,
the service validation request including a request to confirm that the user device is permitted to access the first telecommunications network,
the service validation request being provided based on receiving the request, from the user device, to access the first telecommunications network,
the second telecommunications network being different from the first telecommunications network;
receiving, by the network device and from the server device, a service validation response indicating that the user device is permitted to access the first telecommunications network;
selecting, by the network device, a particular temporary credential from a list of available temporary credentials of the one or more temporary credentials,
wherein the list of available temporary credentials includes temporary credentials not currently assigned to other user devices;
assigning the particular temporary credential to the user device;
providing, by the network device and based on receiving the service validation response, the selected particular temporary credential, of the one or more temporary credentials, to the user device,
wherein the particular temporary credential includes a telephone number; and
transmitting, by the network device, traffic to or from the user device via the first telecommunications network when the particular temporary credential is used by the user device to access the first telecommunications network;
attempting to reach the user device via the first telecommunications network by sending a test message;
determining that a response to the test message was not received within a threshold amount of time;
determining, based on determining that the response to the test message was not received, that the user device is not reachable via the first telecommunications network; and
removing the assignment of the particular temporary credential from the user device based on determining that the user device is not reachable via first telecommunications network.

2. The method of claim 1, further comprising:
determining usage information that identifies a measure of usage of the first telecommunications network by the user device when the user device receives or transmits data via the first telecommunications network using the temporary credential; and
storing or outputting the usage information.

3. The method of claim 2, wherein outputting the usage information includes providing the usage information to an account server associated with the second telecommunications network to cause the account server to assess a charge to an account associated with the user device, based on the usage information.

4. The method of claim 1, wherein the traffic relates to at least one of:
a voice call, or
a data transmission.

5. The method of claim 1, further comprising:
receiving an instruction from the user device to remove the assignment of the particular temporary credential from the user device when the user device disconnects from the first telecommunications network; and
wherein removing the assignment of the particular temporary credential from the user device is further based on the instruction to remove the assignment of the particular temporary credential.

6. The method of claim 5, wherein removing the assignment of the particular temporary credential returns the particular temporary credential to the list of temporary credentials that are not currently assigned to user devices.

7. The method of claim 1, wherein removing the assignment of the particular temporary credential returns the particular temporary credential to the list of temporary credentials that are not currently assigned to user devices.

8. The method of claim 1, wherein the particular temporary credential further includes an international mobile subscriber identity (IMSI).

9. A system comprising:
a non-transitory memory device storing:
a set of processor-executable instructions, and
one or more temporary credentials that allow access to a first telecommunications network; and
a processor configured to execute the processor-executable instructions, wherein executing the processor-executable instructions causes the processor to:
provide, to a server device associated with a second telecommunications network associated with a user device, a service validation request,
the service validation request including a request to confirm that the user device is permitted to access the first telecommunications network,
the service validation request being provided based on a request, from the user device, to access the first telecommunications network,
the second telecommunications network being different from the first telecommunications network;
select a particular temporary credential out of a plurality of temporary credentials that are not currently assigned to other user devices;
assign the particular temporary credential to the user device after receiving the request for the temporary credential,
provide the selected particular temporary credential to the user device,
wherein the particular temporary credential includes a telephone number,
the particular temporary credential being provided based on a service validation response, from the server device, indicating that the user device is permitted to access the first telecommunications network,
wherein providing the particular temporary credential includes providing the temporary credential based on assigning the temporary credential; and transmit traffic to or from the user device via the first telecommunications network when the particular temporary credential is used by the user device to access the first telecommunications network;
attempt to reach the user device via the first telecommunications network by sending a test message;
determine that a response to the test message was not received within a threshold amount of time;
determine, based on determining that the response to the test message was not received, that the user device is not reachable via the first telecommunications network; and
remove the assignment of the particular temporary credential from the user device based on determining that the user device is not reachable via the first telecommunications network.

10. The system of claim 9, wherein executing the processor-executable instructions further causes the processor to:
determine usage information that identifies a measure of usage of the first telecommunications network by the user device when the user device receives or transmits data via the first telecommunications network using the temporary credential; and
store or output the usage information.

11. The system of claim 10, wherein executing the processor-executable instructions, to output the usage information, further causes the processor to provide the usage information to an account server associated with the second telecommunications network to cause the account server to assess a charge to an account associated with the user device, based on the usage information.

12. The system of claim 9, wherein executing the processor-executable instructions further causes the processor to:
assign the particular temporary credential to the user device after receiving the request for the particular temporary credential,
wherein when providing the particular temporary credential the network device is further to provide the temporary credential based on assigning the particular temporary credential;
receive an instruction from the user device to remove the assignment of the particular temporary credential from the user device when the user device disconnects from the first telecommunications network,; and
wherein removing remove the assignment of the particular temporary credential from the user device is performed further based on the instruction to remove the assignment of the particular temporary credential from the user device.

13. The system of claim 9, wherein executing the processor-executable instructions, to remove the assignment of the particular temporary credential from the user device, causes the particular temporary credential to be returned to a group of temporary credentials that are not currently assigned to user devices.

14. The system of claim 9, wherein the particular temporary credential further includes an international mobile subscriber identity (IMSI).

15. A network device, comprising:
a non-transitory memory device storing:
a set of processor-executable instructions, and
one or more temporary credentials that allow access to a telecommunications network; and
a processor configured to execute the processor-executable instructions, wherein executing the processor-executable instructions causes the processor to:
select a particular temporary credential from a list of one or more available temporary credentials of the one or more temporary credentials,
the list of one or more available temporary credentials including temporary credentials not currently assigned to a user device,
the particular credential including a telephone number;
assign the particular temporary credential to a particular user device after selecting the particular temporary credential;
provide the particular temporary credential to the particular user device, the providing causing the particular user device to connect to the telecommunications network;
determine that a connection between the particular user device and the telecommunications network has timed out or that the particular user device is not reachable via the telecommunications network,
wherein the determination that the particular user device is not reachable via the telecommunications network includes sending a test message to the particular user device and not receiving a response to the test message within a threshold period of time; and
remove the assignment of the particular temporary credential from the particular user device based on determining that the connection between the user device and the telecommunications network has timed out or that the particular user device is not reachable via the telecommunications network.

16. The network device of claim 15, wherein executing the processor-executable instructions further causes the processor to:
receive an instruction from the particular user device to remove the assignment of the particular temporary credential from the particular user device when the particular user device disconnects from the telecommunications network,
wherein removing the assignment of the particular temporary credential is further based on receiving the instruction from the particular user device to remove the assignment of the particular temporary credential.

17. The network device of claim 15, wherein removing the assignment of the particular temporary credential from the particular user device allows the temporary credential to be assigned to another user device to allow the other user device to access the telecommunications network.

18. The network device of claim 17, wherein executing the processor-executable instructions further causes the processor to:
determine that the particular user device has reconnected to the telecommunications network within a particular threshold amount of time; and
reassign the particular temporary credential to another user device based on determining that the particular user device has reconnected to the telecommunications network.

19. The network device of claim 15, wherein the particular temporary credential further includes an international mobile subscriber identity (IMSI).

20. The network device of claim 15, wherein removing the assignment of the particular temporary credential returns the particular temporary credential to the list of temporary credentials that are not currently assigned to user devices.

\* \* \* \* \*